(12) United States Patent
Frank

(10) Patent No.: US 6,627,070 B1
(45) Date of Patent: Sep. 30, 2003

(54) APPARATUS FOR AERATION IN A WATER FILTER SYSTEM

(75) Inventor: Marlin A. Frank, Mpls., MN (US)

(73) Assignee: Ecowater Systems, Inc., Woodbury, MN (US)

(*) Notice: Subject to any disclaimer, the term of this patent is extended or adjusted under 35 U.S.C. 154(b) by 51 days.

(21) Appl. No.: 09/842,752

(22) Filed: Apr. 25, 2001

(51) Int. Cl.[7] .................................................. C02F 1/74
(52) U.S. Cl. ...................... 210/120; 210/123; 210/136; 210/205; 210/209; 210/218; 210/278; 210/288; 261/76; 261/DIG. 75
(58) Field of Search ................................ 210/101, 117, 210/123, 136, 205, 209, 218, 288, 278, 120; 261/DIG. 75, 76

(56) References Cited

U.S. PATENT DOCUMENTS

| | | | |
|---|---|---|---|
| 2,237,882 A | | 4/1941 | Lawlor et al. |
| 3,178,024 A | * | 4/1965 | Jacuzzi ........................ 210/253 |
| 3,335,752 A | * | 8/1967 | Hiers et al. ............ 137/599.15 |
| 3,381,823 A | * | 5/1968 | Nash .......................... 210/279 |
| 3,649,532 A | | 3/1972 | McCLean |
| 3,649,533 A | | 3/1972 | Reijonen et al. |
| 4,451,361 A | | 5/1984 | Paterson |
| 4,534,867 A | | 8/1985 | Kreusch et al. ............. 210/722 |
| 4,659,463 A | | 4/1987 | Chandler et al. ........... 210/202 |
| 4,695,378 A | | 9/1987 | Ackman et al. ......... 210/198.1 |
| 4,749,493 A | | 6/1988 | Hicks .......................... 210/617 |
| 4,780,215 A | | 10/1988 | Carlson ....................... 210/722 |
| 4,780,217 A | | 10/1988 | Peterson ..................... 210/758 |
| 4,966,692 A | * | 10/1990 | Overy .......................... 210/123 |
| 5,061,377 A | | 10/1991 | Lee et al. .................... 210/752 |
| 5,080,805 A | | 1/1992 | Houser ........................ 210/722 |
| 5,096,580 A | | 3/1992 | Auchincloss ................ 210/202 |
| 5,096,596 A | | 3/1992 | Hellenbrand et al. ....... 210/721 |
| 5,147,530 A | | 9/1992 | Chandler et al. ............. 210/90 |
| 5,492,630 A | | 2/1996 | Roshanravan et al. ...... 210/703 |
| 5,601,724 A | | 2/1997 | St. Pierre .................... 210/722 |
| 5,618,417 A | | 4/1997 | Spindler ..................... 210/170 |
| 5,725,759 A | | 3/1998 | Schlafer ...................... 210/120 |
| 5,867,900 A | | 2/1999 | Larson et al. ................. 29/890 |
| 6,325,943 B1 | * | 12/2001 | Kohlenberg ................ 210/741 |

* cited by examiner

Primary Examiner—Peter A. Hruskoci
(74) Attorney, Agent, or Firm—Piper Rudnick

(57) ABSTRACT

The present invention provides an apparatus and method for aeration in a filter system. The present invention provides an air injection adaptor for coupling between a filter tank and a valve controller. The air injector adaptor includes an unfiltered water inlet adapted for coupling to the unfiltered water outlet of the valve controller; an unfiltered water outlet in fluid communication with the unfiltered water inlet of the adaptor, the adaptor unfiltered water outlet adapted for coupling to the opening at the upper end of the tank; a filtered water inlet adapted for coupling to the upper end of the stand pipe; a filtered water outlet in communication with the filtered water inlet of the adaptor, the adaptor filtered water outlet adapted for coupling to the filtered water inlet of the control valve; an air source inlet adapted for coupling to a regulated air source; an air source outlet in communication with the air source inlet and adapted for opening into the upper end of the tank; and a vent, the vent having a vent inlet and a vent outlet in communication with the vent inlet, the vent inlet opening into the upper end of the tank.

18 Claims, 5 Drawing Sheets

APPARATUS FOR AERATION IN A WATER FILTER SYSTEM

BACKGROUND OF THE INVENTION

1. Field of the Invention

The present invention relates to the art of water treatment systems. More particularly, the present invention is directed to an apparatus and method of aeration in a water filter system.

2. Description of Related Art

It is well known that water drawn from wells usually contains a variety of impurities or contaminates. The most usual contaminates occurring naturally in well water are iron, sulfur, manganese and arsenic, although many man-made contaminates are now also found. These mineral contaminates may cause stained plumbing fixtures and corroded pipes and in addition, may result in the presence of disagreeable odors and improper taste to the water.

Water with a high iron content can cause rust stains on clothing. Undesirable mineral content is removed from raw water by a variety of methods, although most of the methods involve treatment of the water with oxidizing substances. For example, removal of iron and manganese is commonly effected by running the water through a filter with a bed of minerals periodically regenerated with a chemical such as potassium permanganate to oxidize the dissolved metals forming either oxides or hydrates which are precipitated and removed in the filter. Another method that is widely used is that of injecting a quantity of oxygen, either as pure oxygen or more commonly in the form of air. Possibly the most widely accepted method for introducing air into well water is by means of air aspiration produced through use of a venturi orifice. Of a somewhat more limited use has been the injection of air under pressure into a body of water to provide the oxygen necessary to oxidize the metal ions for ultimate removal from the water.

A system illustrating the use of air aspiration to precipitate iron is shown in U.S. Pat. No. 5,096,580. In this arrangement, well water is drawn by means of a pump through a pipe and into a pressure tank. From that point, the water ultimately is directed, upon a demand basis to an oxygen induction device, which is in fact a venturi jet, that aspirates air into the water at that point. The induction of air created by the venturi orifice is located close to the filter tank so that build up of precipitated iron oxide or iron hydrates is prevented from occurring in the pipe. The preferred embodiment is shown with the oxygen induction device coupled to the valve control assembly which is coupled to the filter tank.

In U.S. Pat. No. 3,649,532, water enters through an inlet and is passed through a venturi type air aspirator unit where it then continues to flow through a valve and to an inlet tube which is located on the interior of a filter tank. An automatic air release is provided in the upper portion of the tank to vent air and sulfur containing gases to the exterior. One problem encountered with this type of system results from the fact that the incoming air/water mixture are present together for a comparatively short time before being released into the interior of the tank and oxidation of the dissolved metal content is often inadequate to effect good cleansing of the well water.

A different sort of system is shown in U.S. Pat. No. 4,749,493. In this instance, an oxygen supply is introduced into the bottom of a column which contains a plurality of rings. The interior of the column is first filled with an oxygen supply and then water flows upwardly through a tube, exiting through a screen. The water then percolates downwardly through the rings acquiring oxygen from the oxygen enriched environment that had been initially placed in the column from the oxygen supply. In this apparatus, the oxygenated water is withdrawn through the discharge ports located in the bottom portion of the column. U.S. Pat. No. 4,695,378 shows an apparatus used for the purpose of treating acid mine water and involves the use of a pair of jet pumps using a venturi effect to provide aeration of the water. Following introduction of water through aspiration, the flow is then into a static mixer which has a helical interior that swirls the water and air to provide some additional mixing of the air and water. This aspiration describes a process for introducing air into acid mine water and performing a mechanical mixing operation but does not deal with the ultimate use of water for consumer use. Other patents which may be referred to are U.S. Pat. Nos. 3,649,533, 4,659,463, 5,061,377, 5,096,596 and 5,147,530.

U.S. Pat. No. 4,534,867 discloses a system for removing iron from potable water. An air pump introduces air into the untreated water. The aerated water is then introduced into a tank containing a bed of granular activated carbon. U.S. Pat. No. 5,096,596 discloses an apparatus for removal of mineral contaminants from water comprising an aeration tank with an inlet for admitting water and an outlet for discharge. The outlet is coupled via a tube to a filter valve. The filter valve is coupled to a filter tank which receives the aerated water from the aeration tank.

While the processes that constitute the prior art recognize the use of air or oxygen introduction into water, for certain purifications, problems still exist. For example with systems utilizing venturi aspiration of air into water, the venturi devices are both difficult to maintain and to obtain the introduction of sufficient quantities of air into the water to effect complete oxidation of dissolved mineral elements. The venturi is a flow restrictor which limits water pressure to the end user or adds a load on the well pump. When oxidation does occur, depending upon the location where the air is aspirated, precipitation of mineral elements from solution can occur which can result blockage and constriction of conveying pipes. No effective system is known in which sufficient oxidation is obtained by merely tumbling air and water together. In systems using air injection, unremoved excess air creates blockages and noises in plumbing systems.

U.S. Pat. No. 5,725,759 is assigned to the instant assignee and relates to a system for removing certain contaminants or impurities from well water by oxidation effected by the injection of air into a reaction chamber having first and second sections wherein the air is first mixed intimately with incoming water through the use of baffles that break up the fluid flow paths and where thereafter in, the second section of the reaction chamber, the baffles act to strip the previously aerated water of excess air and permit it to be vented, so that it does not enter the water distribution system. The aerated water is then delivered to an iron filter via a control valve assembly.

An efficient, economical apparatus and system is provided for dissolving substantial quantities of air (oxygen) into well water and also for removing excess oxygen that might otherwise result in transport difficulties. In addition, the system insures that there is maximum physical interaction between the oxygen bearing air and the water so that thorough aeration of the water is accomplished to oxidize the maximum amount of dissolved mineral content. The apparatus further provides for continued agitation of the air/water mixture to result in the removal of excess air and to thereafter enable its venting to the exterior of the aerating reactor apparatus. Specifically, by providing a vent in an air/water reactor chamber at such a location that excess amounts of air can be present in a first section of the chamber while exhausting the excess air from a second section of the chamber.

The prior art systems are often fouled by the reaction of aeration, i.e., due to the precipitated iron. The blockage will deteriorate the system performance. Eventually, the blockage will cause failure requiring maintenance. The required maintenance can be costly, difficult and time consuming to repair.

In addition, the prior art systems have been found not to be efficient in the oxidation of iron and other impurities and the removal of the oxidized iron or other impurity.

SUMMARY OF THE INVENTION

The principal object of the present invention is to provide a method and apparatus for aeration in a water filter system which is minimizes the blockage of system components due to the precipitated iron or other impurity.

Another object of the present invention is to provide a method and apparatus for aeration in a water filter system which may be maintained and repaired quickly and in a cost effective manner.

Yet another object of the present invention is to provide a method and apparatus for aeration in a water filter system which holds the dissolved oxygen at a constant high level.

Still another object of the present invention is to provide a method and apparatus for aeration in a water filter system which may be retrofit to existing systems and provide the advantages noted herein.

The present invention therefore provides a filter for oxidizing and removing impurities from water, the filter comprising: a tank having an upper end and a lower end, an opening at the upper end, and a cavity for receiving a filter resin; an air injector coupled to the opening of the tank, the air injector having an air source inlet for coupling to a regulated air source, an air source outlet in communication with the air source inlet, the air source outlet opening into the upper end of the tank; a vent, the vent having a vent inlet and a vent outlet in communication with the vent inlet, the vent inlet opening into the upper end of the tank; an unfiltered water inlet for coupling to a source of unfiltered water, the unfiltered water inlet in fluid communication with the upper end of the tank for introducing unfiltered water into the tank; a stand pipe having an upper pipe end and a lower pipe end, the stand pipe located in the tank with the lower pipe end extending into the lower end of the tank; and a filtered water outlet in fluid communication with the upper end of the stand pipe, whereby air and unfiltered water are introduced into the upper end of the tank and the water is aerated in the tank.

In the preferred embodiment, the present invention provides an air injector adaptor having an unfiltered water inlet adapted for coupling to the unfiltered water outlet of the valve controller; an unfiltered water outlet in fluid communication with the unfiltered water inlet of the adaptor, the adaptor unfiltered water outlet adapted for coupling to the opening at the upper end of the tank; a filtered water inlet adapted for coupling to the upper end of the stand pipe; a filtered water outlet in communication with the filtered water inlet of the adaptor, the adaptor filtered water outlet adapted for coupling to the filtered water inlet of the control valve; an air source inlet adapted for coupling to a regulated air source; an air source outlet in communication with the air source inlet and adapted for opening into the upper end of the tank; and a vent, the vent having a vent inlet and a vent outlet in communication with the vent inlet, the vent inlet opening into the upper end of the tank. A float valve is provided having an upper end for sealing engagement with the vent inlet.

The present invention also provides a method of aeration in an oxidizing filter system, the method comprising the steps of: injecting air into an upper portion of an filter tank, bypassing a valve controller of the filter system; injecting unfiltered water into the head of air in the upper portion of the filter tank to aerate the unfiltered water and to replace filtered water drawn from the tank; drawing the aerated unfiltered water through a filter media so as to filter the unfiltered water; and providing the aerated filtered water on demand.

DESCRIPTION OF THE PREFERRED EMBODIMENT

Figure 1:
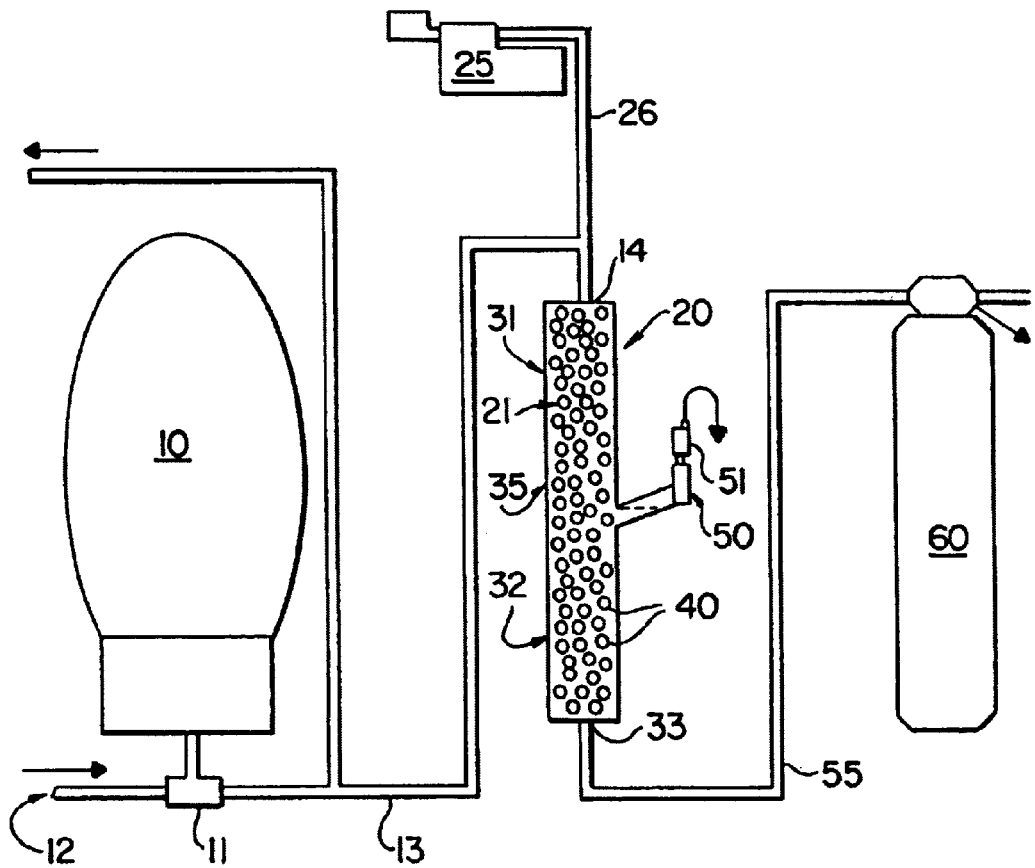
FIG. 1 is a schematic representation of a mineral reduction system utilizing an iron reactor apparatus of a prior art system.

FIG. 1 is but one example of prior art iron filter systems described above in the background section. Generally, the principle components of the system include a pressure tank 10 which is connected through pressure switch 11 to a source 12, such as a well pump. The pressure tank is used to accumulate water taken from the well and stored until it is needed for use. Pressure tank 10 is connected, as by means of pipe 13, to an inlet 14 located in the top of a vessel 20 which defines a reaction chamber 21. Also connected to inlet 14 is an air pump 25 which provides a source of pressurized air for introduction into the reaction chamber 21, through pipe 26.

The reaction chamber 21 is made up a substantially vertically disposed elongated body having an upper end 31 and a lower end 32, the lower end 32 having an outlet 33. The preselected length of the intermediate portion 35 of reaction chamber 21 is located about midway between the upper and lower ends 31, 32 of reaction chamber 21.

Contained within the reaction chamber 21 are fluid flow baffles 40 which are distributed as unsupported individual bodies substantially throughout the entire volume of the reaction chamber. These baffles conveniently take the form of perforated or hollow balls or spheres which are about one inch in diameter and may be constructed of a plastic such as polyethylene and polypropylene. The baffle elements are present to insure that two individual reactions take place within the reaction chamber. First, when the water is introduced into the upper section 31 of reaction chamber 21, it must flow over the surfaces of the baffle elements 40; thereby the water is exposed to the maximum effect of the air already present in the reaction chamber. As the water flows downwardly through the chamber 21 and into the lower section 32, the baffles then continue to turbulently mix air and water, but simultaneously separate the air from the water, the separated air migrating upwardly toward the air vent 50. Air vent 50 contains a valve 51 which permits release of the separated excess air from the second region within the reaction chamber 21. Valve 51 may be a one way valve that is normally open but which closes to preclude flow of water therethrough. The water then passes out of the reaction chamber through outlet 33 and, via pipe 55, goes into the iron filter 60. The iron filter 60 may contain a substance such as BIRM.TM. to further oxidize any remaining solute mineral as well as to filter out those that have precipitated from solution.

The iron reactor is intended to be used in a residential household with a well-pump system. The iron reactor operates in conjunction with the well pump system which provides pressure to the household plumbing. A typical well pump cycle begins when the well pump turns on at the lower pressure limit and stays on until enough water has been introduced to pressurize tank 10 for the upper pressure limit to be reached and the pump then turns off. The air pump 25 of the iron reactor system is wired directly to the same pressure sensitive switch 11 used by the well pump. When the well pump turns on, the air pump 25 also turns on. The air pump at this time delivering air to the reaction chamber 31 while water is being delivered to pressure tank 10. After well pump turns off, the air pump 25 also turns off but the reaction chamber is now charged with a fresh quantity of oxygen rich air. Subsequently as water is called for, it enters the upper section 31 of the iron reactor where the aeration baffles 32 first mix the air and water together and then it goes into lower section 32 for separation of the excess air from the water.

Figure 2:
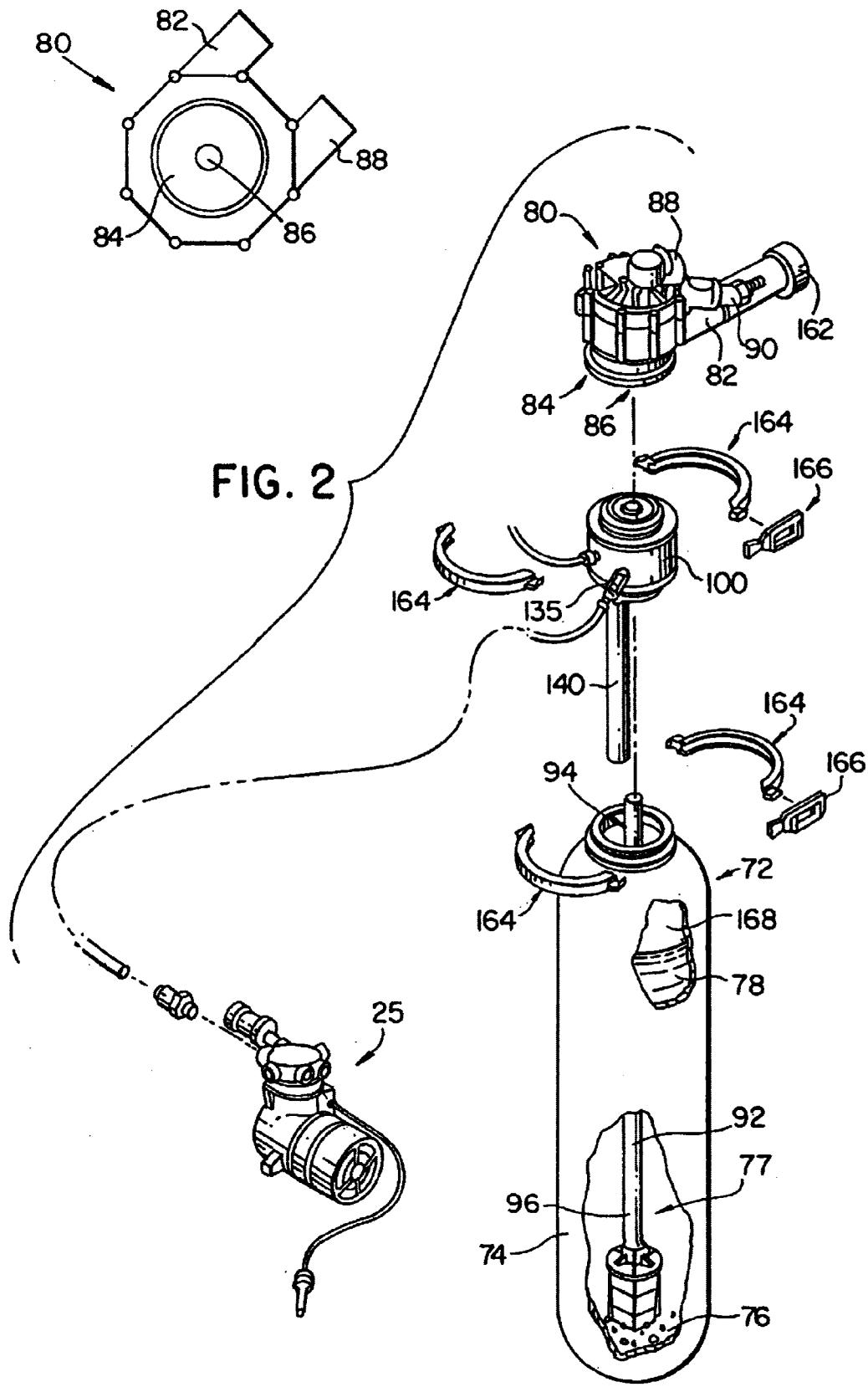
FIG. 2 is a schematic representation of a system for aeration in an iron filter, including an air injector adaptor, in accordance with the present invention.

FIG. 2 discloses an iron filter tank 70. The tank 70 is similar to the prior art tanks. The tank 70 includes an upper portion 72 and a lower portion 74. The tank 70 includes quartz 76, a filter medium 77, and unfiltered water 78.

A prior art valve controller 80 is shown. The controller 80 is similar to that disclosed in U.S. Pat. No. 5,867,900, which is incorporated herein by reference. The controller 80 includes an inlet 82 for unfiltered water, an outlet 84 for unfiltered water, an inlet 86 for filtered water, an outlet 88 for filtered water and a drain outlet 90.

A stand pipe 92 extends within the tank 70 and includes an upper portion 94 and a lower portion 96.

Figure 3A:
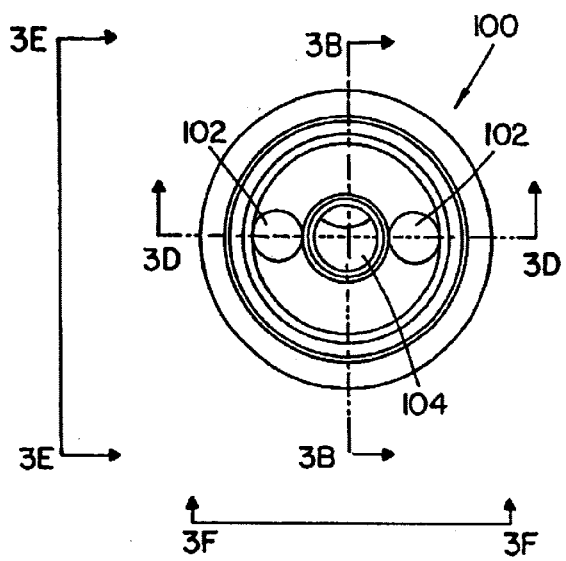
FIG. 3A is a top view of the air injector adaptor shown in FIG. 2.
Figure 3B:
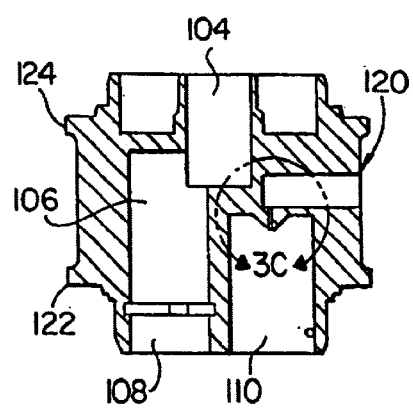
FIG. 3B is a cross section of the air injector adaptor taken along lines 3B—3B of FIG. 3A.
Figure 3C:
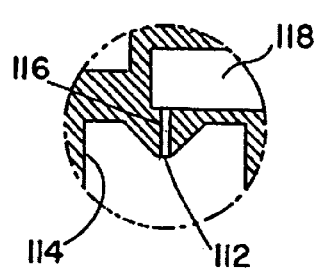
FIG. 3C is a detail of the air injector adaptor taken from the detail 3C of FIG. 3B.

An adaptor 100 is shown in FIG. 2. A top view of the adaptor 100 is shown in FIG. 3A. FIG. 3A also shows the inlets 102 for unfiltered water and the outlet 104 for filtered water. FIG. 3B is a cross section of the adaptor 100 taken along lines 3B—3B of FIG. 3A. A passage way 106 is shown to couple the outlet 104 to an inlet 108 for filtered water. The upper portion 94 of the stand pipe 92 is received by the inlet 108. An air float chamber or bore 110 is shown and includes an orifice or vent inlet 112 which is also shown in the detail of FIG. 3C. The bore 110 includes a side wall 114.

The vent inlet 112 is coupled via passage way 116, and passage way 118, to a vent outlet 120. A lower rim 122 is provided for coupling to the iron tank 70. An upper rim 124 is provided for coupling to the valve controller 80.

Figure 3D:
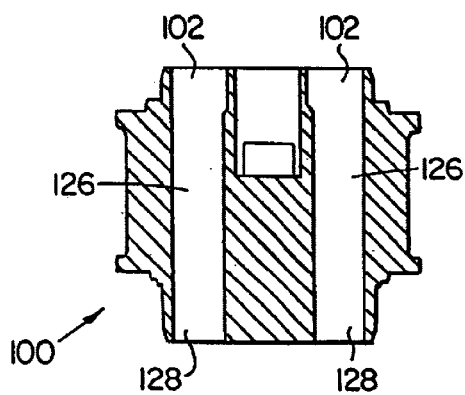
FIG. 3D is a cross section of the air injector adaptor taken along line 3D—3D of FIG. 3A.

FIG. 3D is a cross section of the adaptor 100 taken along lines 3D—3D of FIG. 3A. FIG. 3D shows the inlets 102 for unfiltered water which are coupled via passage ways 126 to outlets 128.

Figure 3E:
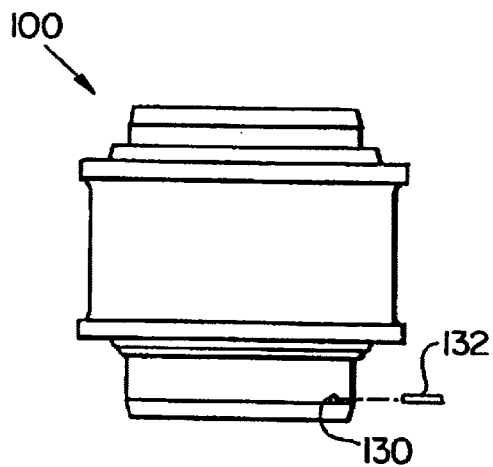
FIG. 3E is a side view of the air injector adaptor taken along line 3E—3E of FIG. 3A.

FIG. 3E is a side view of the air injector adaptor 100 taken along lines 3E—3E of FIG. 3A. A hole 130 is shown. FIG. 3B shows that the hole 130 extends through the adapter 100 and opens into the bore 110. A pin 132 is adapted for insertion in the hole 130 in a manner to be described below in greater detail.

Figure 3F:
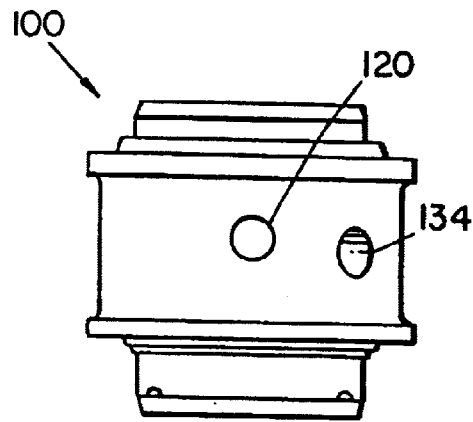
FIG. 3F is a side view of the air injector adaptor taken along line 3F—3F of FIG. 3A.
Figure 3G:
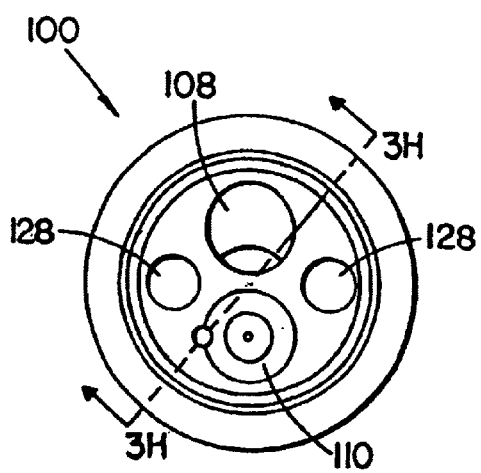
FIG. 3G is a bottom view of the adaptor of FIG. 3A.
Figure 3H:
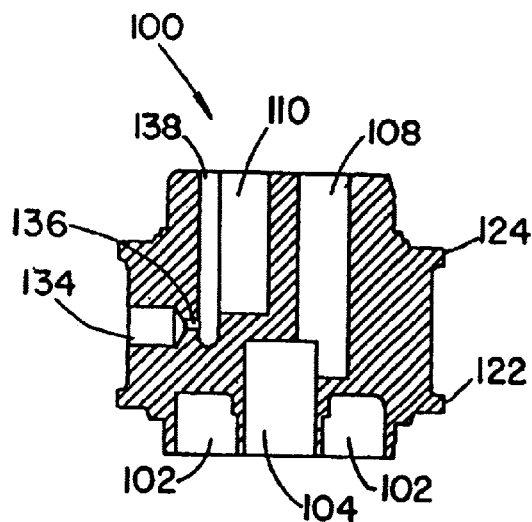
FIG. 3H is a cross section of the air injector adaptor taken along line 3H—3H of FIG. 3G, the adaptor being in an inverted orientation.

FIG. 3F is a side view of the air injection adaptor 100 taken along lines 3F—3F of FIG. 3A. An air source inlet 134 is shown. As shown in FIG. 2, an air check valve 135 is coupled to the inlet 134. The air check valve 135 is coupled to the air pump 25. FIG. 3G is a bottom view of the adaptor 100 of FIG. 3A. The outlets 128 for the unfiltered water are shown, as well as the inlet 108 for the filtered water, and the bore 110. FIG. 3H is a cross section of the air injector adaptor 100 taken along lines 3H—3H of FIG. 3G, the adaptor being in an inverted orientation. The air source inlet 134 is shown to be connected via passage way 136 to a side channel 138. The side channel 138 is formed by machining a half-moon recess into the side wall 114 of the bore 110. The side channel 138 therefore opens into the bore 110.

Figure 4A:
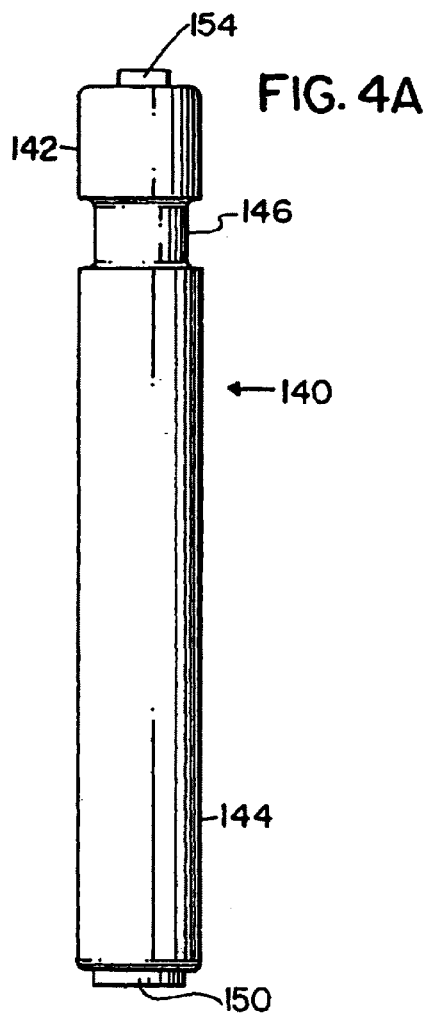
FIG. 4A is a perspective view of an air vent float of the adaptor shown in FIG. 2, in accordance with the present invention.
Figure 4B:
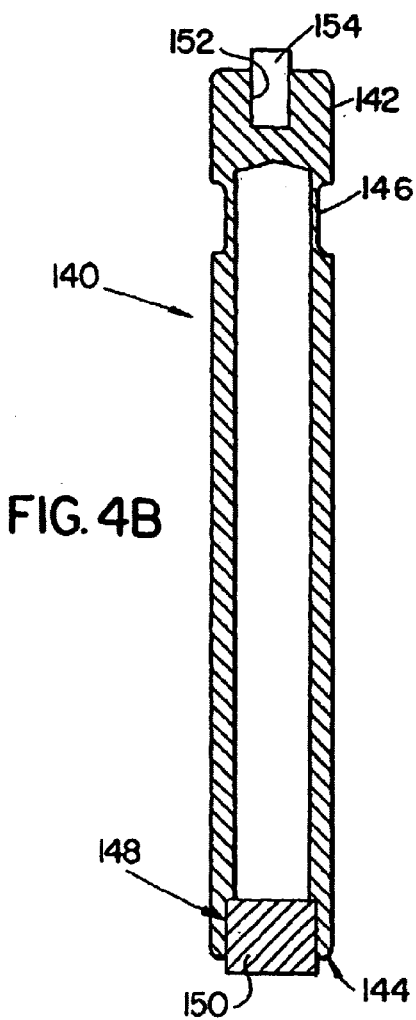
FIG. 4B is a cross sectional view of the air vent float of FIG. 4A.

FIG. 4A is a perspective view of an air vent float 140. FIG. 4B is a cross section of the air vent float 140. The air vent float 140 includes an upper end 142 and a lower end 144. A notch 146 extends around the periphery of the float 140. The float 140 is generally tubular-shaped having an opening 148 which receives a brass fitting 150. The upper end 142 include a recess 152 which receives a rubber plug 154. The upper end 142 of the float 140 is received by the bore 110. The outside diameter of the float 140 is slightly less than the inside diameter of the bore 110. The pin 132 is then inserted into the hole 130 and extends into the bore 110 and into the notch 146, thereby limiting the movement of the float 140 between an upper position and a lower position. It is important that the float 140 move easily between the upper and lower positions without binding within the bore 110. In the upper position, the rubber plug 154 sealingly engages the vent inlet 112.

Figure 5:
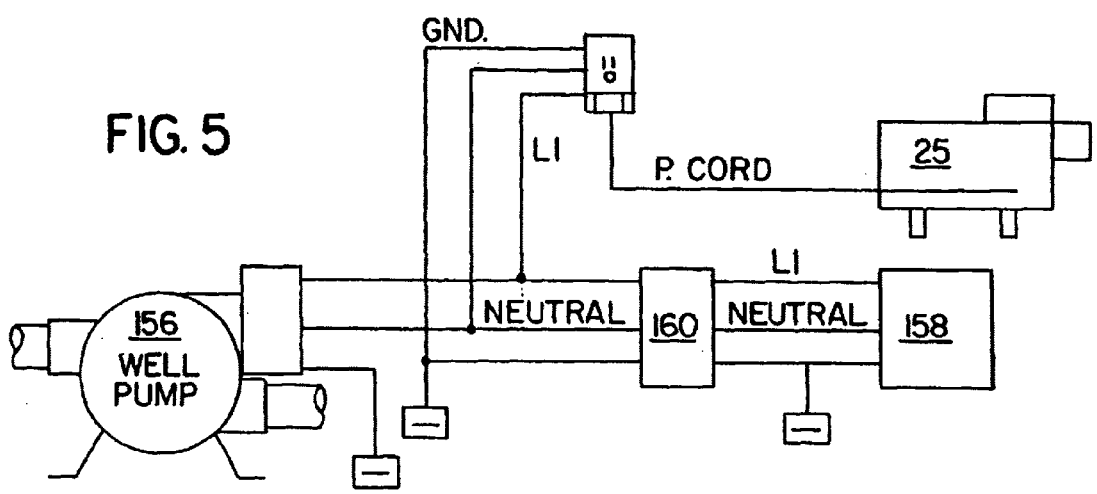
FIG. 5 is a perspective view of a control of an air pump, in accordance with the present invention.

FIG. 5 shows a perspective view of a control of the air pump 25. A well pump 156 is shown to be coupled to a power source 158 via a control 160. The control 160 may be a pressure switch 11 as shown and described in connection with FIG. 1. The air pump 25 is also shown to be coupled to the power source 158 via the control 160. It will be appreciated from FIG. 5 that the air pump 25 will be operated whenever the well pump 156 is operated, as dependent upon the control 160. In an alternative embodiment, the control 160 may be the flow switch 162 shown in FIG. 2. In this embodiment, the air pump 25 will be operated whenever there is flow into the inlet 82 of the valve control 80.

With reference to FIG. 2, the stand pipe 92 and the float 140 are coupled to the adaptor 100 as described above. The adaptor 100 is coupled to the iron tank 70 via two clamp retainers 164 and a clamp section 166. The valve controller 80 is coupled to the adaptor 100 in a similar manner, using two clamp retainers 164 and a clamp section 166.

It will be appreciated from the foregoing, that the air pump 25 will introduce additional air into the tank 70 so as to maintain a head of air 168 in the upper portion of the iron tank 70. The head of air 168 has a vertical height of approximately four to six inches. The air pump 25 will be operated whenever the well pump 156 is operated or when flow is detected in the inlet 82 of the valve controller 80. In this manner, the iron filter system is operated in a continuous mode, rather than in a batch mode such as in the prior art. The air check valve 135 will prevent air from escaping the iron tank 70. In addition, the float 140 will be floating in the water 78. With a normal level of water, the float 140 will be urged upward within the tank 70 into the upper position. In the upper position, the rubber plug 154 will seal the vent inlet 112 so as to prevent air from escaping the iron tank 70.

In the event the head of air 168 becomes too great, the level of water 78 will drop from its normal level. The float 140 will ride with the water 78 to a lower level, eventually to the lower position of the float 140. The float 140 will move from the upper position when the head of air 168 has a vertical height of approximately ten inches. The rubber plug 154 will therefore no longer seal the vent inlet 112. As a result, pressurized air in the head of air 168 will travel up through the side channel 138 and escape the adaptor 110 via the vent inlet 112 and the vent outlet 120. As the pressurized air escapes, the water level will rise towards the normal level. Eventually, the float 140 will rise and return to the upper position and again the rubber plug 154 will seal the vent inlet 112 preventing further escape of air.

Unfiltered water will enter the inlet 82 of the valve controller 80, pass through the adaptor 100 and exit the adaptor 100 at the outlets 128 and into the head of air 168. Air bubbles will travel approximately six inches down into the water 78 from the force of the water flow rate. As a result, there is an efficient aeration of the unfiltered water entering the iron tank 70. Further, it will be noted that aeration does not take place in the valve controller 80. Also, aeration takes place remotely from the vent inlet 112. Therefore the system of the present invention does not expose the control valve 80 or other critical components to the precipitated iron as in the prior art systems. Each time water 78 is used in the home or commercial establishment, or the air pump 25 is operated, air pump 25 adds fresh air to the top of the tank 70. Oxygen depleted air and excess air are controllably vented through the float 140 with a net affect of retaining a fixed volume of air in the tank 70.

During the iron filter backwash cycle, the air pump 25 is also operated so as to channel an air supply into the chamber 110. Thus the supply of air in the chamber 110 prevents the wash water from flowing upwards to the vent inlet 112. The flow of air during the backwash cycle prevents the iron precipitate from eventually blocking the vent inlet 112. The air pump 25 is operated during the backwash cycle by means of the control 160, i.e., either the pressure switch 11 or the flow switch 162.

If the vent inlet 112 does become plugged with debris, the air pump 25 may be temporarily connected to the drain outlet 120 to clear the debris.

The above described embodiments are merely illustrative of the features and advantages of the present invention.

Other arrangements and advantages may be devised by those skilled in the art without departing from the spirit and scope of the present invention. Accordingly, the invention should not be deemed to be limited to the above detailed description but only by the claims that follow.

I claim:

1. A filter for oxidizing and removing impurities from water, the filter comprising:

a tank having an upper end and a lower end, an opening at the upper end, and a cavity for receiving a filter resin;

an air injector coupled to the opening of the tank, the air injector having an air source inlet for coupling to a regulated air source, an air source outlet in communication with the air source inlet, the air source outlet opening into the upper end of the tank to produce a head of air in said tank;

a vent, the vent having a vent inlet and a vent outlet in communication with the vent inlet, the vent inlet opening into the upper end of the tank;

an unfiltered water inlet for coupling to a source of unfiltered water, the unfiltered water inlet in fluid communication with the upper end of the tank for introducing unfiltered water into the head of air, to aerate unfiltered water entering the tank;

a stand pipe having an upper pipe end and a lower pipe end, the stand pipe located in the tank with the lower pipe end extending into the lower end of the tank arranged to receive filtered water that has passed through said filter resin; and a filtered water outlet in fluid communication with the upper end of the stand pipe, whereby air and unfiltered water are introduced into the upper end of the tank and the water is aerated in the tank.

2. The filter of claim 1, wherein the air injector is an air injector adaptor, the air injector adaptor having a shut off valve for opening and closing the vent.

3. The filter of claim 2, wherein the shut off valve is a float having an upper end for sealing engagement with the vent inlet.

4. The filter of claim 3, wherein the air injector adaptor includes a lower side and a bore extending through the lower side and opening into the upper end of the tank, the bore defining an end wall, the vent inlet being located at the end wall, the float includes a lower end, the upper end in slidable engagement within the bore, the float being capable of sliding between an upper position and a lower position, wherein in the upper position the upper end of the float is in sealing engagement with the vent inlet, the bore having a side wall which includes a longitudinally extending channel which opens to the bore, the channel is in communication with the upper end of the tank and the air source inlet, the channel is in communication with the vent inlet when the float valve is not in the upper position.

5. The filter of claim 4, wherein the float includes a side and a notch is located on the side near the upper end of the float, the adaptor includes a hole which is located adjacent the upper end of the bore, a pin is located in the hole and extends into the bore and into the notch, whereby the pin limits the movement of the float valve between the upper and lower positions.

6. The filter of claim 5, wherein the lower end of the float valve includes a weight.

7. The filter of claim 2, further comprising a check valve coupled to the air source inlet of the adaptor, the check valve allowing flow only in the direction into the adaptor, an air pump coupled to the check valve, means for activating the air pump whenever there is flow of unfiltered water into the tank, and means for activating the air pump during backwash.

8. The filter of claim 2, further comprising a check valve coupled to the air source inlet of the adaptor, the check valve allowing flow only in the direction into the adaptor, an air pump coupled to the check valve, means for activating the air pump whenever a well pump is on, and means for activating the air pump during backwash.

9. The filter of claim 2, further comprising a valve controller, the valve controller is coupled to the adaptor, the valve controller having the unfiltered water inlet and the filtered water outlet, and having an unfiltered water outlet in fluid communication with the unfiltered water inlet and a filtered water inlet in fluid communication with the filtered water outlet, the adaptor having an unfiltered water inlet and an unfiltered water outlet in fluid communication with the unfiltered water inlet of the adaptor, the adaptor unfiltered water inlet coupled to the unfiltered water outlet of the control valve and the unfiltered water outlet opening into the upper end of the tank, the adaptor further having a filtered water inlet and a filtered water outlet in communication with the filtered water inlet of the adaptor, the adaptor filtered water outlet coupled to the filtered water inlet of the control valve and the adaptor filtered water inlet coupled to the upper end of the stand pipe.

10. An air injector adaptor for coupling between an oxidizing filter tank and a valve controller, the filter tank having an upper end and a lower end, an opening at the upper end, a cavity for receiving a filter resin, a stand pipe having an upper pipe end and a lower pipe end, the stand pipe located in the tank with the lower pipe end extending into the lower end of the tank arranged to receive filtered water that has passed through said filter resin, the valve controller having an unfiltered water inlet, an unfiltered water outlet in fluid communication with the unfiltered water inlet, a filtered water outlet, and a filtered water inlet in fluid communication with the filtered water outlet, the air injector adaptor comprising:

an unfiltered water inlet adapted for coupling to the unfiltered water outlet of the valve controller;

an unfiltered water outlet in fluid communication with the unfiltered water inlet of the adaptor, the adaptor unfiltered water outlet adapted for coupling to the opening at the upper end of the tank;

a filtered water inlet adapted for coupling to the upper end of the stand pipe;

a filtered water outlet in communication with the filtered water inlet of the adaptor, the adaptor filtered water outlet adapted for coupling to the filtered water inlet of the control valve;

an air source inlet adapted for coupling to a regulated air source;

an air source outlet in communication with the air source inlet and adapted for opening into the upper end of the tank to produce a head of air in said tank, wherein said unfiltered water outlet is arranged to introduce unfiltered water into the head of air, to aerate unfiltered water entering the tank; and a vent, the vent having, a vent inlet and a vent outlet in communication with the vent inlet, the vent inlet opening into the upper end of the tank.

11. The air injector adapter of claim 10, further comprising a shut off valve for opening and closing the vent.

12. The air injector adapter of claim 11, wherein the shut off valve is a float valve having an upper end for sealing engagement with the vent inlet.

13. The air injector adapter of claim 12, wherein the air injector adaptor includes a lower side and a bore extending through the lower side and adapted for opening into the upper end of the tank, the bore defining an end wall, the vent inlet being located at the end wall, the float valve includes a lower end, the upper end in slidable engagement within the bore, the float being capable of sliding between an upper position and a lower position, wherein in the upper position the upper end of the float is in sealing engagement with the vent inlet, the bore having a side wall which includes a longitudinally extending channel which opens to the bore, the channel is in communication with the air source inlet and is adapted for communication with the upper end of the tank, the channel is in communication with the vent inlet when the float valve is not in the upper position.

14. The air injector adapter of claim 13, wherein the float includes a side and a notch is located on the side near the upper end of the float, the adaptor includes a hole which is located adjacent the upper end of the bore, a pin is located in the hole and extends into the bore and into the notch, whereby the pin limits the movement of the float valve between the upper and lower positions.

15. The air injector adapter of claim 14, wherein the lower end of the float includes a weight and the upper end of the float includes a rubber plug.

16. The air injector adapter of claim 14, wherein the unfiltered water outlet and the filtered water inlet of the adaptor are located at the lower side of the adaptor, and the unfiltered water inlet and the filtered water outlet of the adaptor are located at an upper side of the adaptor, whereby the adapter is easily coupled to the filter tank and the valve controller is readily coupled to the adaptor.

17. The air injector adaptor of claim 16, further comprising an upper rim at the upper side of the adaptor and a lower rim at the lower side of the adaptor, whereby the adaptor is secured to the tank via the lower rim and a clamp, and the adaptor is secured to the control valve via the upper rim and a clamp.

18. The air injector adapter of claim 11, further comprising a check valve coupled to the air source inlet of the adaptor, the check valve allowing flow only in the direction into the adaptor.

\* \* \* \* \*